Oct. 9, 1956
A. K. REDCAY
2,765,635
PROCESS FOR SEPARATION OF GASES
Filed Aug. 7, 1952
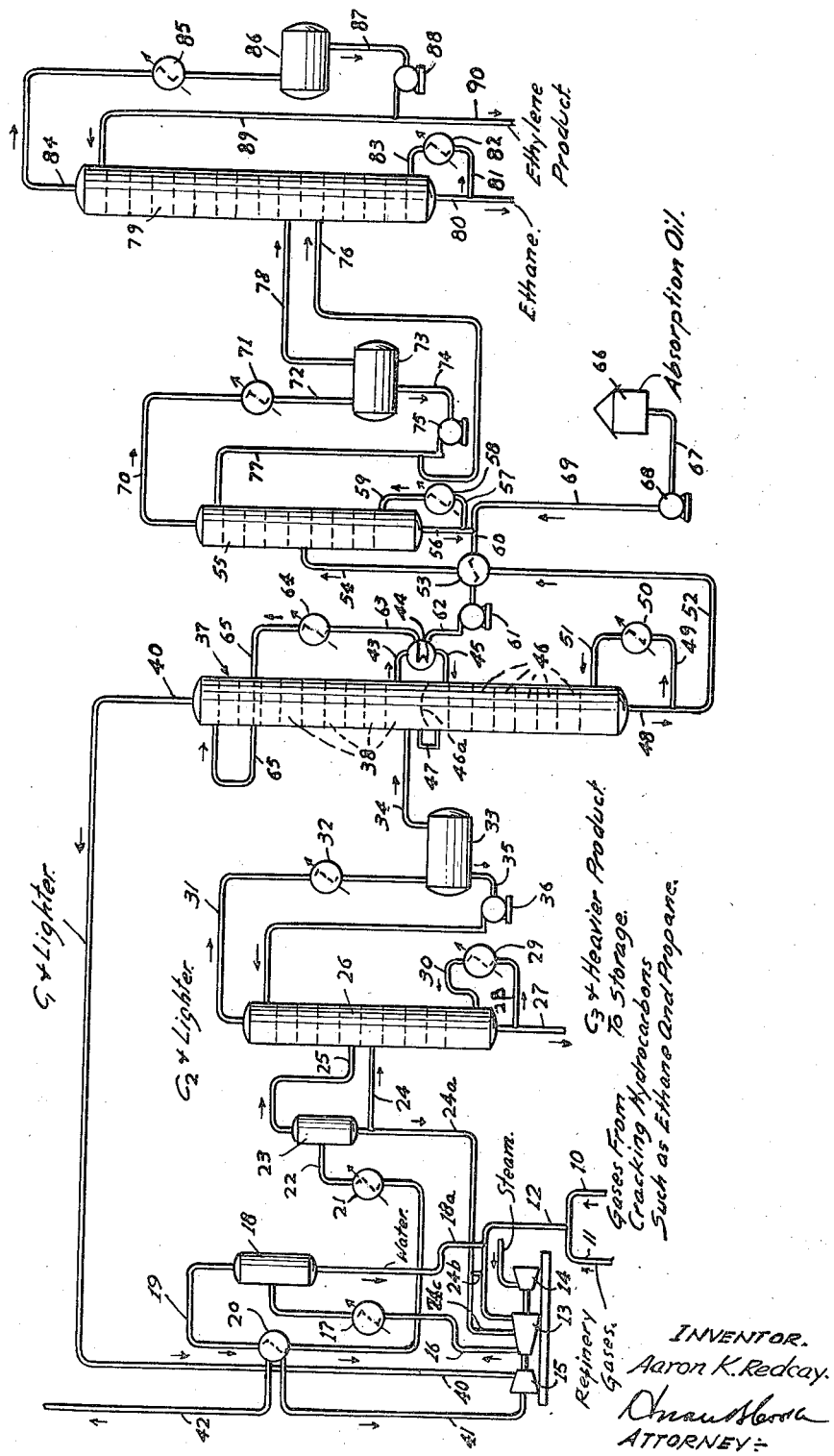
INVENTOR.
Aaron K. Redcay.
ATTORNEY.

United States Patent Office 2,765,635
Patented Oct. 9, 1956

2,765,635

PROCESS FOR SEPARATION OF GASES

Aaron K. Redcay, Mount Lebanon, Pa., assignor to Gulf Oil Corporation, Pittsburgh, Pa., a corporation of Pennsylvania Application August 7, 1952, Serial No. 303,183

13 Claims. (Cl. 62—122)

This invention relates to the separation of gaseous mixtures. More particularly, the invention is concerned with the separation of substantially pure ethylene from a mixture of gases containing components both heavier and lighter than ethylene.

Various methods have heretofore been employed for separating the components of relatively close boiling normally gaseous mixtures, including fractional distillation, oil absorption, selective adsorption on solid adsorbents, or combinations thereof.

In separations accomplished by fractional distillation, the gaseous mixture to be separated requires the application of high pressures, low temperatures or both. Where such gaseous mixtures contain components having low critical temperatures, abnormally low temperatures may be required to cause sufficient liquefaction, thereby rendering the separation process uneconomical or impracticable.

In selective adsorption processes on solid adsorbents, difficulties may arise because of the nature or composition of the charge stock and the separation according to such processes may then become inefficient or uneconomical.

Some of the gaseous mixtures to be subjected to a separation process are thermally sensitive. For example, gaseous mixtures derived from the cracking of petroleum fractions to produce normally liquid fuels, or the gaseous mixtures obtained by the thermal cracking of normally gaseous hydrocarbons are frequently thermally sensitive because they contain unsaturated hydrocarbons which are subject to thermal polymerization and/or alkylation reactions under the conditions encountered in the separation process. Polymerization or alkylation of such thermally sensitive materials represents a loss of valuable constituents of the mixture, particularly since valuable mono-olefinic and saturated hydrocarbons can become involved in alkylation reactions either between themselves or in combination with more highly unsaturated hydrocarbons, and valuable mono-olefinic hydrocarbons can become involved in copolymerization reactions with more highly unsaturated hydrocarbons. Furthermore, solid polymers may be formed by the polymerization or copolymerization of the highly unsaturated hydrocarbons, and such reactions cause operating difficulties. Thus solid polymers may be formed by the heat of compression encountered in the compression step necessary to liquefy the gaseous mixture to be separated, and solid polymers may also be formed in subsequent distillation steps. The solid polymers tend to foul the compressors and plug the trays of fractionating apparatus, thereby causing an uneconomical shutdown of the entire plant.

In instances where it has been attempted to recover the valuable components of a normally gaseous hydrocarbon-containing mixture by first at least partially liquefying the mixture and then treating it with an absorption oil, it has been customary to subject substantially the entire charge stock to contact with the absorption oil to remove the lighter constituents, such as methane, hydrogen, etc. In such instances, large quantities of absorption oil are required, and it is necessary to process the entire enriched absorption oil to recover the valuable absorbed constituents. Furthermore, the nature of the absorption oil employed has been such as to require relatively high temperatures and pressures in the distillation of the enriched oil to recover the absorbed constituents efficiently. Such high temperatures and pressures are particularly troublesome if the enriched oil contains thermally sensitive constituents.

It is therefore an object of this invention to separate valuable components, particularly ethylene, from a gaseous mixture containing thermally sensitive hydrocarbons, while avoiding the difficulties attendant upon the various thermal reactions of such hydrocarbons.

It is a further object of this invention to separate ethylene from a gaseous mixture containing components both heavier and lighter than ethylene by a process which enables the use of relatively small quantities of absorption oil as compared to prior art oil absorption processes.

It is a still further object of this invention to separate ethylene from a gaseous mixture containing it by an economical process permitting the use of lower pressures and temperatures than have heretofore been feasible.

Other objects will be apparent from the following description.

The objects of my invention are achieved by partially liquefying a normally gaseous hydrocarbon-containing mixture, containing ethylene and components heavier and lighter than ethylene, fractionally distilling the partially liquefied mixture to obtain as bottoms components heavier than ethane and as overhead other components of the mixture, subjecting the overhead to contact with an absorption oil to separate as a gaseous overhead methane and lighter components and to form an enriched absorption oil containing $C_2$ hydrocarbons, and separating the $C_2$ hydrocarbons from their solution in the absorption oil. The ethylene can then be separately recovered from the $C_2$ hydrocarbons.

My invention is particularly adapted to the recovery of ethylene and other individual hydrocarbon components from normally gaseous hydrocarbon-containing mixtures, containing ethylene and components lighter and heavier than ethylene. For example, ethylene can be advantageously recovered from the refinery gases obtained as by-products in the pyrolysis of petroleum oils in the presence or absence of catalysts to obtain normally liquid fuels. In some instances selected stocks, such as ethane, propane or mixtures thereof, or oils such as gas oils, are cracked under selected conditions chosen to obtain a high content of ethylene in the product gases. My invention is also applicable to the recovery of ethylene and other valuable components from such cracking gases. The charge gases thus obtained may contain, in addition to ethylene, nitrogen, hydrogen, carbon monoxide, carbon dioxide, hydrogen sulfide, methane, ethane, acetylene, propylene, propane, butenes, butanes, pentenes, pentanes, and related diene hydrocarbons, such as butadiene, pentadiene, cyclopentadiene and the like.

It will be understood by those skilled in the art that, in the practice of my invention, those charge gases which contain carbon dioxide and hydrogen sulfide are preferably subjected to a preliminary purification treatment to remove these materials, which otherwise may cause operating difficulties. This removal can be accomplished by conventional methods, such as by absorption in aqueous amine solutions, such as ethanolamine, and need not further be described here. It will also be understood that, in some instances, it is desirable to remove the acetylene from those charge gases containing it, since the acetylene tends to be recovered as an impurity with the ethylene and may render the ethylene unsuitable for certain uses. In such instances, the acetylene can be removed by subjecting the charge gas to selective hydrogenation in the presence of a suitable hydrogenation catalyst, whereby the acetylene is selectively hydrogenated without substantially affecting the ethylene constituent of the charge gas. Methods of selectively hydrogenating acetylene are also well known in the art.

Notwithstanding these preliminary purification steps, the charge gases may still be thermally sensitive, i. e., subject to polymerization and/or alkylation reactions at elevated temperatures and pressures, and thus there may result a loss of valuable components and/or operating difficulties may occur in the processing of such gases, as described hereinabove.

I have found that these difficulties can be avoided and substantial economies achieved in the separation process and the apparatus required therefor if the gaseous mixture to be separated is first fractionally distilled, after being partially liquefied, to remove therefrom as bottoms all components heavier than ethane. In so doing, not only are all thermally sensitive components of the original charge gas removed before they can cause difficulty, but substantial economies are effected in the further processing of the retained components, as will be described more fully hereinbelow, whether or not thermally sensitive materials are present in the charge gas.

The conditions employed in the first fractional distillation are such that, at the pressure employed, the temperature at the bottom of the column, while sufficiently high to drive overhead components of the charge gases lighter than propylene, is not so high as to cause reaction of any of the thermally sensitive components. While the maximum temperature which is thus employed will vary with the nature and amount of any thermally sensitive components present, as will be understood by those skilled in the art, a temperature not in excess of about 225° F. will generally be satisfactory. Of course, if the charge gas contains no thermally sensitive components, it is immaterial if the bottoms temperatures recited are exceeded in the first fractionation, but a suitable bottoms temperature will be chosen sufficient to effect the desired separation of all $C_3$ and heavier components as bottoms and all $C_2$ and lighter components as overhead without imposing inefficient or uneconomical pressure, heating and cooling requirements on the operation of the column.

Following the initial fractionating described, the overhead therefrom, consisting of $C_2$ and lighter components, is contacted with an absorption oil in a fractionating absorber to separate as a gaseous overhead all methane and lighter components and to form a rich absorption oil containing essentially only the $C_2$ components. In a preferred embodiment of my invention, the absorption oil employed contains a $C_4$, $C_5$, or $C_6$ hydrocarbon fraction, and in particular a saturated, mono-olefinic or aromatic hydrocarbon fraction, such as a fraction containing cyclohexane, pentane, cyclohexene, benzene, toluene, or a mixture of such fractions.

The combination of the initial fractionation step described with the step of treating the overhead fraction thus obtained with an absorption oil results in material advantages. In the first place, since the overhead from the initial fractionation contains only $C_2$ and lighter components and only the $C_2$ components are extracted in the absorption step, less absorption oil is required than in those prior processes where substantially the entire charge gas is treated with an absorption oil to separate the methane and lighter components. In addition, since the heat of absorption or solution of the extractable components is material, and since the efficiency of the absorption step is dependent on maintaining relatively low temperatures, the absorption of only the $C_2$ components will require less cooling and therefore less refrigeration and less power to provide for such cooling. Finally, the treatment of only the overhead from the initial fractionation with the absorption oil, instead of the entire charge gases, prevents contamination of the absorption oil with heavier components of the charge gases and tends to maintain the composition of the absorption oil constant, even when the stripped oil is continuously recycled to the absorption step, thereby insuring greater uniformity of conditions and control in the absorption.

Still further advantages accrue from the use of a $C_4$ to $C_6$ hydrocarbon fraction or a mixture of such fractions as the absorption oil. Thus, since neither the overhead treated or such an absorption oil contains any appreciable $C_3$ components, the absorber will contain the $C_2$ components, as the major volatile components desired to be recovered, and this enables the stripping of the $C_2$ components from the rich oil to be done more cleanly and efficiently with reduced capital equipment and operating costs than would otherwise be the case.

It may be seen, therefore, that the initial fractionation to separate as overhead the $C_2$ and lighter components of the charge gas followed by the treatment of said overhead with an absorption oil, preferably a $C_4$ to $C_6$ absorption oil, uniquely cooperate to give superior results, whether or not the initial charge gas contains thermally sensitive components.

Following the absorption step described, the enriched absorption oil is fractionally distilled to separate overhead the $C_2$ hydrocarbons and, as bottoms, the lean absorption oil which is recycled to the absorption step. The $C_2$ overhead is then separated into substantially pure ethylene and ethane.

My invention will now be described in detail with reference to the attached drawing, showing a specific embodiment illustrative of my invention. In the drawing, the single figure represents a diagrammatic flow diagram of an apparatus adapted to carry out my invention.

Referring to the drawing, ethylene-containing gases, obtained for example from the thermal cracking of hydrocarbons, such as ethane and propane, or from heavier hydrocarbons, such as fuel oil, are introduced into the system through line 10. Alternatively, refinery gases obtained as by-products from the cracking of petroleum oils to obtain liquid fuels are introduced into the system through line 11. If desired, gases from both sources can be processed together. Such gases usually contain minor amounts of water, and as will be more fully explained below the water component can be used as a coolant when the charge gases are being compressed.

The charge gases pass through line 12 to the suction end of a suitable compressor, such as turbo-compressor 13, where they are compressed to a suitable pressure, such as about 400 p. s. i. g., sufficient to cause partial liquefaction of the gases upon subsequent cooling. In general, it is desirable to compress the gases to such an extent that, upon subsequent cooling, substantially all of the components of the gases heavier than ethane will be liquefied. The compressor 13 may be driven by any suitable prime mover, such as the steam turbine 14 mechanically coupled thereto. Alternatively or additionally, the compressor 13 may be driven by a turbo-expander 15 operated by absorber off-gas passing therein through line 40.

Where the charge gas contains thermally sensitive constituents the compression is conducted in such a manner as to avoid temperatures at which these constituents become reactive, say not in substantial excess of about 225° F. This can be accomplished by the use of multistage compressors, limiting the amount of compression in each stage to avoid temperatures in excess of those stated, and cooling the compressed gases between stages by interstage coolers. Preferably, however, the heat of compression is removed by injecting into the gas being compressed a fine spray or mist of a vaporizable liquid, as disclosed and claimed in my copending application Serial No. 303,181 filed on even date. The liquefied charge gas and in particular the water component thereof constitutes a desirable vaporizable liquid coolant for this purpose, although, of course, the hydrocarbon portion of the charge gas can also be employed as liquid coolant. As shown in the drawing, the water component can be returned to the compressor from accumulator 18 by line 18a. Alternatively, or simultaneously in conjunction therewith, a small amount of the liquid portion of charge gas can be withdrawn from accumulator 23 through line 24a and injected as a fine spray either into the feed to the compressor by means of line 24b, or directly into the compressor itself by means of line 24c, or both. The vaporization of the cold liquefied charge gas upon injection at these points serves to reduce the heat of compression so that temperatures at which the thermally sensitive constituents of the charge become reactive are avoided. When multistage compressors are employed, the liquefied charge gas can also be injected into the feed stream between stages to achieve the same result.

After compression, the charge gas passes through line 16 into a cooler 17, where it is cooled by indirect heat exchange with water, and then through accumulator 18 from which at least a portion of the water is removed and returned as coolant to the compressor as heretofore set forth. From accumulator 18 the hydrocarbon charge gas passes through line 19 into a heat exchanger 20 where it is further cooled by indirect heat exchange with the expanded and cooled off-gas from the absorber, as will be more fully described hereinafter. The charge gas then passes to a cooler 21 where it is further cooled by indirect heat exchange with a suitable refrigerant, such as liquid ethane or liquid propane, and is then discharged through line 22 to an accumulator 23. The charge gas at this point has been substantially liquefied, the liquid portion being introduced through line 24 into fractionating column 26 and the still gaseous portion being introduced through line 25 into fractionating column 26 at a point above the introduction of the liquid. As will be understood by those skilled in the art, more or less cooling than that described, depending on the composition of the charge gas, may be required to liquefy substantially all components of the charge heavier than ethane. It will also be understood that, where the charge gas still contains water vapor, it will be desirable to dry it prior to passing it to the fractionator by passing the charge gas through driers (not shown) containing a suitable desiccant, such as alumina.

The fractionating column 26 is operated under such conditions that the overhead product contains components of the original charge lighter than propylene, and the bottoms product contains components heavier than ethane. The bottoms product is withdrawn through line 27 and sent to storage or other desired disposition, a portion thereof being recirculated through line 28, reboiler 29 and line 30 into the base of the column 26 to supply heat of reboiling thereto. The temperature at the bottom of the column 26 is preferably controlled so as not to exceed a temperature at which thermally sensitive constituents become reactive. This temperature, however, is sufficiently high to drive overhead ethane and lighter components.

The overhead from the column 26, containing the $C_2$ hydrocarbons and lighter components of the original charge, is passed through line 31 and partially condensed in condenser 32 by a suitable refrigerant, such as liquid propane, the partially condensed overhead then passing into reflux accumulator 33. A portion of the condensate is withdrawn from the reflux accumulator through line 35 and pump 36 and is passed into the top of fractionating column 26 to serve as liquid reflux therefor. The uncondensed overhead is passed by means of line 34 into the absorption section 38 of a fractionating absorber designated generally in the drawing as 37.

In the absorption section 38 the overhead from fractionating column 26 is countercurrently contacted by a cold liquid absorption oil, preferably consisting of a $C_4$ to $C_6$ hydrocarbon fraction, suitably a mixture of these hydrocarbons entering the top of the absorption section through line 65.

The absorption section 38 is operated under such conditions of temperature and pressure that essentially all of the $C_2$ components are dissolved in the absorption oil, whereas the methane and lighter components are not substantially dissolved. The methane and lighter components pass overhead as a gaseous stream through line 40. Since the off-gas leaving through line 40 is under pressure, it may be utilized, as shown in the drawing, to furnish part of the power required to drive the compressor 13. In accordance therewith, the off-gas is expanded through turbo-expander 15 coupled mechanically to the compressor 13. In passing through the turbo-expander, the cold off-gas is further cooled by reason of being expanded with the production of external work, and the expanded cold off-gas may advantageously be used to furnish part of the refrigeration required to liquefy the incoming charge gases. Thus, after passing through the turbo-expander, the cold off-gas passes through line 41 and into indirect heat exchange in heat exchanger 20 with the incoming charge gases. Thereafter, the off-gas passes through line 42 to any desired disposition.

Since it is desirable to operate the absorption section 38 to dissolve essentially all of the $C_2$ components, the absorption liquid will ordinarily dissolve small but definite amounts of methane and possibly some of the lighter gases. In order to expel such undesirable gases from the rich absorption oil, the rich oil is passed by means of line 43 through heat exchanger 44, where it is warmed by cooling lean absorption oil passing to the absorption section 38, and then by means of line 45 into the stripping section 46 of the fractionating absorber 37. As shown in the drawing, the stripping section 46 is separated from the absorption section 38 by a suitable partition 46a.

In the stripping section, sufficient heat is supplied to the base thereof to expel dissolved gases lighter than ethylene from the enriched absorption oil. This can be accomplished by circulating a portion of the bottoms through line 48, line 49, reboiler 50 and line 51 back into the bottom of the stripping section 46. The expelled light gases rise through the stripping section in counter-current contact with descending enriched absorption oil and then pass into the absorption section 38 through line 47. The stripped off-gases similarly rise through the absorption section 38 and are disposed of through line 40, as described. There is thus achieved a fractionating effect in the fractionating absorber 37, the net result of which is to separate as a gaseous overhead all of the constituents of the original charge gas lighter than ethylene and to recover as liquid bottoms an enriched absorption oil containing only the $C_2$ hydrocarbons of the original charge.

From the bottom of the stripping section 46, the enriched absorption oil is withdrawn through line 48 and is passed by means of line 52 into indirect heat exchange with lean absorption oil in heat exchanger 53, thereby cooling the lean absorption oil and warming the enriched absorption oil. From heat exchanger 53, the enriched absorption oil is passed into fractionating column 55 by means of line 54.

In the fractionating column 55 the rich absorption oil is fractionated to separate overhead the absorbed $C_2$ hydrocarbons and to remove as bottoms product a lean absorption oil. Fractionating column 55 is provided with a reboiler 58, a portion of the bottoms being circulated through line 56, line 57, reboiler 58 and line 59 back into the base of the fractionating column to provide heat of reboiling therefor. The bottoms product, lean absorption oil, is withdrawn through line 56 and may then be cooled are recirculated to the fractionating absorber 37 for reuse. In accordance therewith, the lean oil is passed into line 60, through heat exchanger 53, where it is cooled by indirect heat exchange with rich absorption oil, and is then pumped by means of pump 61 through line 62 into heat exchanger 44. The lean oil is further cooled in heat exchanger 44 by indirect heat exchange with cold rich absorption oil passing from the absorption section 38 to the stripping section 46. From the heat exchanger 44 the lean absorption oil pases through line 63 to a cooler 64, where it is cooled by a refrigerant, such as liquid propane. The lean absorption oil then passes through line 65 into the top of the fractionating absorber, as previously described.

In starting up the plant, or where additional lean absorption oil may be needed, lean absorption oil may be withdrawn from storage tank 66 by means of line 67 and pump 68 and passed into the system through line 69 and line 60.

The overhead product from the fractionating column 55, consisting of $C_2$ hydrocarbons, passes through line 70 into a condenser 71 where it is at least partially condensed against a refrigerant, such as liquid propane. The overhead then passes through line 72 into a reflux accumulator 73, from which the liquid condensate is withdrawn by means of line 74 and pump 75. A portion of the liquid condensate is passed through line 77 into the top of the fractionating column 55 to serve as liquid reflux therefor. The remaining portion of the liquid condensate passes through line 76 into ethylene fractionator 79. If desired, fractionator 55 may be operated so that the overhead product is withdrawn from reflux accumulator 73 by means of line 78 and passes into the ethylene fractionator 79 at a point above the introduction of any liquid feed.

In the ethylene fractionator 79 the $C_2$ hydrocarbons are fractionated into an ethylene overhead and ethane bottoms. Liquid ethane bottoms are withdrawn through line 80, a portion thereof circulating through line 81, reboiler 82 and line 83 back into the base of the fractionating column to provide heat of reboiling therefor. The remaining ethane withdrawn through line 80 may be sent to any desired disposition, including cracking to produce more ethylene. The ethylene top product is withdrawn from the ethylene fractionator by means of line 84 and is condensed in condenser 85 against a suitable refrigerant, such as liquid ethane. The condensate is passed to reflux accumulator 86 from which it is withdrawn through line 87 and pump 88. A portion of the liquid ethylene condensate is passed through line 89 into the top of fractionating column 79 to serve as liquid reflux therefor, and the remaining portion is withdrawn through line 90 as substantially pure ethylene product.

I shall illustrate a typical operation of the system described with a thermally sensitive, ethylene-containing charge gas having the following analysis:

| Component: | Mol. percent |
|---|---|
| Hydrogen | 12.8 |
| Methane | 31.0 |
| Acetylene | .5 |
| Ethylene | 23.3 |
| Ethane | 7.1 |
| Propylene | 10.8 |
| Propane | 10.8 |
| Butadiene | .6 |
| Butylene | .6 |
| Pentene and heavier | 2.5 |
| | 100.0 |

This charge gas in addition contains minor amounts of water, such as of the order of 3 to 4 volume per cent. The charge gas is compressed in a multistage centrifugal compressor and previously liquefied water derived from charge gas is injected during compression to prevent thermal reactions. The compressed charge gas leaves the compressor at a pressure of about 400 p. s. i. g. and is cooled to a temperature of about 105° F. whereupon any condensed water and hydrocarbons are separated. The compressed gases are then dried by passing them through beds of a suitable dessicant, such as activated alumina. Thereafter they are cooled to 40° to 50° F. so that components heavier than ethane are liquefied. The gaseous and liquid portions are then passed into the first fractionator. The first fractionator is operated at a pressure of about 375 p. s. i. g., a bottom temperature of about 165° F. and a top temperature of about −20° F. In the first fractionator, components of the original charge heavier than ethane, and including the thermally sensitive constituents, are separated as bottoms; and components lighter than propylene are taken overhead. The uncondensed fractionator overhead is passed into the fractionating absorber which is operated at a pressure of about 335 p. s. i. g., a bottom temperature of about 125° F. and a top temperature of −50° F. Cold liquid $C_4$—$C_6$ mixture is introduced into the top of the fractionating absorber as lean absorption oil, and a solution of the $C_2$ components in the liquid $C_4$—$C_6$ mixture is withdrawn from the bottom of the fractionating absorber as a rich absorption oil. In the stripping section of the absorber sufficient plates are employed and sufficient reboiling heat is used to strip completely the methane and lighter components from the rich absorption oil. Rejected methane and lighter components are withdrawn as a gaseous stream from the top of the absorber. The rich absorption oil is then fractionated in a fractionator which is operated at a pressure of about 290 p. s. i. g., a bottom temperature of 220° F. and a top temperature of about 10° F. In the fractionator, the $C_2$ components of the rich absorption oil are separated overhead, and the denuded absorption oil is withdrawn as bottoms to be recycled, after suitable cooling, to the top of the fractionating absorber as lean absorption oil. The $C_2$ components separated overhead are condensed and sent to an ethylene fractionator which is operated at a pressure of about 245 p. s. i. g., a bottom temperature of about 18° F. and a top temperature of about −18° F. Substantially pure ethylene it taken overhead and substantially pure ethane is separated as bottoms.

While I have described my invention with reference to certain specific embodiments, it will be obvious to those skilled in the art that many modifications can be made. I have already indicated that multistage compressors may be employed in lieu of the single compressor shown in the drawing. Furthermore, if the charge gases are already under considerable pressure, as may be the case with certain refinery gas streams, advantage may be taken of that fact by introducing such streams at a higher compression level of the compressor or compressors. Although I have shown certain arrangements of coolers and heat exchangers, particularly in connection with the liquefaction of the charge gas and the cooling of the recycled lean absorption oil, other arrangements may be employed to take advantage of the cooling or heating effects of the various streams. Depending upon the amount of $C_2$ hydrocarbons to be extracted and the design and capacity of the fractionating absorber, it may be desirable to provide additional cooling in the absorption section by the use of absorber intercoolers, to obtain more cooling than can be supplied merely by cooling the lean absorption oil. While an ethylene fractionator has been shown for the separation of the $C_2$ components into ethane and ethylene, it will be apparent that other means can be employed for this separation. For example, selective adsorption on adsorbents, such as activated charcoal, activated alumina, silica gel or the like, with fluidized or moving beds of adsorbent, in accordance with known methods, can successfully be employed. The fractionating columns and fractionating absorber will contain trays, as indicated diagrammatically in the drawing, of a suitable design, such as bubbletrays, and in sufficient amount to effect the separations described. In addition it is obvious that, in the entire system as described, suitable valves, control devices and instrumentation will be employed as required.

Resort may be had to such other variations and modifications as fall within the spirit of the invention and the scope of the appended claims.

What I claim is:

1. In a process for the separation of ethylene from a gaseous mixture containing components lighter and heavier than ethylene wherein said gaseous mixture is partially liquefied and then subjected to separation, the improvement which comprises fractionally distilling said partially liquefied gaseous mixture to separate as bottoms substantially all of the components heavier than ethane and as overhead the remaining components of the mixture, extracting said overhead with an absorption oil to dissolve therein only $C_2$ hydrocarbons, and separating the $C_2$ hydrocarbons from their solution in the absorption oil.

2. In a process for the separation of ethylene from a gaseous mixture containing components lighter and heavier than ethylene wherein said gaseous mixture is partially liquefied and then subjected to separation, the improvement which comprises fractionally distilling said partially liquefied gaseous mixture to separate as bottoms substantially all of the components heavier than ethane and as overhead the remaining components of the mixture, extracting said overhead with an absorption oil selected from the group consisting of liquid $C_4$ to $C_6$ hydrocarbon fractions and mixtures of such fractions to dissolve therein only $C_2$ hydrocarbons, and separating the $C_2$ hydrocarbons from their solution in the absorption oil.

3. In a process for the separation of ethylene from a gaseous mixture containing components lighter and heavier than ethylene wherein said gaseous mixture is partially liquefied and then subjected to separation, the improvement which comprises fractionally distilling said partially liquefied gaseous mixture to separate as bottoms substantially all components heavier than ethane and as overhead the remaining components of the mixture, extracting said overhead with an absorption oil selected from the group consisting of liquid $C_4$ to $C_6$ hydrocarbon fractions and mixtures of such fractions to dissolve therein only $C_2$ hydrocarbons, fractionally distilling the solution of the $C_2$ hydrocarbons in said absorption oil to obtain as bottoms said absorption oil and as overhead said $C_2$ hydrocarbons, recycling said bottoms as absorption oil to the preceding extraction step, and separating ethylene from said $C_2$ hydrocarbon overhead.

4. A process for the separation of ethylene from a gaseous mixture containing components lighter and heavier than ethylene and thermally sensitive components, which comprises compressing said gaseous mixture under conditions to avoid thermal reaction of said thermally sensitive components, cooling said compressed gaseous mixture to partially liquefy the same, fractionally distilling under conditions to avoid thermal reaction of said thermally sensitive components said partially liquefied gaseous mixture to separate as bottoms substantially all of the components heavier than ethane and all thermally sensitive components and as overhead the remaining components of the mixture, extracting said overhead with an absorption oil to dissolve therein only $C_2$ hydrocarbons, and separating the $C_2$ hydrocarbons from their solution in the absorption oil.

5. The process of claim 4, wherein thermal reaction of the thermally sensitive components during compression is avoided by multistage compression and cooling of the compressed gases between stages.

6. The process of claim 4, wherein thermal reaction of the thermally sensitive components during compression is avoided by injection into the gases undergoing compression of a fine spray of a part of the liquefied portion of the partially liquefied gaseous mixture.

7. A process in accordance with claim 4 in which the gaseous mixture containing components lighter and heavier than ethylene and thermally sensitive components also contains a minor amount of water, and in which thermal reaction of the thermally sensitive components during compression is avoided by injection into the gases undergoing compression of a fine spray of the liquefied portion of the partially liquefied gaseous mixture comprising liquid water.

8. A process for the separation of ethylene from a gaseous mixture containing components lighter and heavier than ethylene and thermally sensitive components which comprises compressing said gaseous mixture under conditions to avoid thermal reaction of said thermally sensitive components, cooling said compressed gaseous mixture to partially liquefy the same, fractionally distilling under conditions to avoid thermal reaction of said thermally sensitive components said partially liquefied gaseous mixture to separate as bottoms substantially all of the components heavier than ethane and all thermally sensitive components and as overhead the remaining components of the mixture, extracting said overhead with an absorption oil selected from the group consisting of liquid $C_4$ to $C_6$ hydrocarbon fractions and mixtures of such fractions to dissolve therein only $C_2$ hydrocarbons, and recovering the $C_2$ hydrocarbons from solution in the absorption oil.

9. A process for the separation of ethylene from a gaseous mixture containing components lighter and heavier than ethylene and thermally sensitive components which comprises compressing said gaseous mixture under conditions to avoid thermal reaction of said thermally sensitive components, cooling said compressed gaseous mixture to partially liquefy the same, fractionally distilling under conditions to avoid thermal reaction of said thermally sensitive components said partially liquefied gaseous mixture to separate as bottoms substantially all of the components heavier than ethane and all thermally sensitive components and as overhead the remaining components of the mixture, extracting said overhead with an absorption oil selected from the group consisting of $C_4$ to $C_6$ hydrocarbon fractions and mixtures of such fractions to dissolve therein only the $C_2$ hydrocarbons, fractionally distilling said solution of $C_2$ hydrocarbons in said absorption oil to obtain as bottoms said absorption oil and as overhead said $C_2$ hydrocarbons, recycling said bottoms as absorption oil to the preceding extraction step, and fractionally distilling said $C_2$ hydrocarbons to obtain substantially pure ethylene.

10. In a system for the separation of ethylene from a gaseous mixture containing components heavier and lighter than ethylene, means for partially liquefying said gaseous mixture, a first fractionating column for fractionally distilling said partially liquefied gaseous mixture to obtain as bottoms substantially all of the propylene and heavier and as overhead ethane and lighter, a fractionating absorption column, means for introducing said overhead into said column at an intermediate point thereof, means for introducing an absorption oil into said column adjacent the top thereof, means within said column for countercurrently contacting said overhead and absorption oil, means for withdrawing methane and lighter from the top of said column, means for withdrawing an enriched absorption oil from the bottom of said column, a second fractionating column for fractionally distilling said enriched absorption oil, means for recycling denuded absorption oil from the bottom of said second fractionating column to the top of said absorption column, means for withdrawing $C_2$ hydrocarbons from the top of said second fractionating column, and means for recovering individual $C_2$ hydrocarbons.

11. In a system for the separation of ethylene from a gaseous mixture containing components heavier and lighter than ethylene, a compressor for compressing said gaseous mixture, cooling means for partially liquefying said gaseous mixture, means for injecting into said gaseous mixture during its compression a fine spray of a portion of the liquefied gaseous mixture, thereby reducing the heat of compression of said gaseous mixture, a first fractionating column for fractionally distilling said partially liquefied gaseous mixture to obtain as bottoms propylene and heavier and as overhead ethane and lighter, a fractionating absorption column for dissolving from said overhead $C_2$ hydrocarbons and for rejecting the methane and lighter in said overhead, a second fractionating column for fractionally distilling overhead the $C_2$ hydrocarbons from the solution obtained in said absorption column, and a third fractionating column for separating ethylene from said $C_2$ hydrocarbon overhead.

12. A system in accordance with claim 11, including a turbo-expander mechanically coupled to said compressor, means for passing rejected methane and lighter from said fractionating absorption column through said turbo-expander, and means for passing cooled and expanded methane and lighter from said turbo-expander through said cooling means in indirect heat exchange with said compressed gaseous mixture, thereby furnishing work for driving said compressor and cooling for liquefying said gaseous mixture.

13. A process for the separation of ethylene from a gaseous mixture containing components lighter and heavier than ethylene, water and thermally sensitive components which comprises compressing said gaseous mixture, cooling said compressed gaseous mixture to partially liquefy the same, injecting into the gaseous mixture undergoing compression a fine spray comprising liquefied water from said partially liquefied gaseous mixture, thereby avoiding thermal reaction of the thermally sensitive components of said gaseous mixture during compression, fractionally distilling under conditions to avoid thermal reaction of said thermally sensitive components said partially liquefied gaseous mixture to separate as bottoms all components heavier than ethane and all thermally sensitive components and as overhead other components of the mixture, extracting said overhead with an absorption oil selected from the group consisting of liquid $C_4$ to $C_6$ hydrocarbon fractions and mixtures of such fractions to dissolve therein only $C_2$ hydrocarbons and to reject methane and lighter components, expanding said rejected methane and lighter components with the production of external work thereby cooling the same, passing the cooled and expanded methane and lighter components in indirect heat exchange with the original compressed gaseous mixture to furnish cooling for said first-mentioned cooling step, fractionally distilling said solution of $C_2$ hydrocarbons in said absorption oil to obtain as bottoms said absorption oil and as overhead said $C_2$ hydrocarbons, recycling said bottoms as absorption oil to the preceding extraction step, and fractionally distilling said $C_2$ hydrocarbons to separate ethylene therefrom.

References Cited in the file of this patent

UNITED STATES PATENTS

| | | |
|---|---|---|
| 1,751,537 | Vianello | Mar. 25, 1930 |
| 2,038,834 | Frey | Apr. 28, 1936 |
| 2,168,683 | Raigorodsky | Aug. 8, 1939 |
| 2,226,467 | Hjerpe | Dec. 24, 1940 |
| 2,290,957 | Hachmuth | July 28, 1942 |
| 2,428,521 | Latchum | Oct. 7, 1947 |
| 2,468,750 | Gudendrath | May 3, 1949 |
| 2,519,343 | Berg | Aug. 22, 1950 |
| 2,519,344 | Berg | Aug. 22, 1950 |
| 2,571,329 | Berg | Oct. 16, 1951 |
| 2,573,341 | Kniel | Oct. 30, 1951 |
| 2,596,785 | Nelly | May 13, 1952 |
| 2,600,110 | Hachmuth | June 10, 1952 |
| 2,666,019 | Winn | Jan. 12, 1954 |
| 2,722,113 | Deming | Nov. 1, 1955 |